United States Patent Office 3,585,162
Patented June 15, 1971

3,585,162
POLYURETHANE RECREATIONAL SURFACES HAVING IMPROVED TEAR STRENGTH
George G. Sapp, San Pablo, Calif., assignor to Chevron Research Company, San Francisco, Calif.
No Drawing. Continuation-in-part of abandoned application Ser. No. 812,333, Apr. 1, 1969. This application Jan. 7, 1970, Ser. No. 1,312
Int. Cl. C08k 1/06, 1/12, 1/16
U.S. Cl. 260—37
3 Claims

ABSTRACT OF THE DISCLOSURE

Resilient paving materials comprising cross linked, organic-polyol based polyurethanes containing inert fillers and as a tear strength improver a minor portion of attapulgite.

CROSS-REFERENCES TO RELATED APPLICATION

This application is continuation-in-part of U.S. patent application Ser. No. 812,333, filed Apr. 1, 1969, now abandoned.

BACKGROUND OF THE INVENTION

Title of the invention

Recent years have seen the introduction and increasing use of synthetic, resilient, covering materials in athletic events, e.g., for running tracks and approaches for pole-vault, high-jump, and broad-jump pits. Synthetic coverings suitable for race-tracks for horses have also been proposed and used.

The materials have been of two general types—those which are factory-prepared and may be laid down from rolls and fastened to a suitable base, and those which have been prepared at the site at which they are to be laid.

The most commonly employed materials, particularly for the latter-described use, have been polyurethane elastomers. These materials are generally prepared by the generally described reaction of isocyanates and hydroxy compounds to yield urethanes. It is most common to employ a mixture of polyols, particularly diols and triols, and polyisocyanates, preferably diisocyanates, in order to achieve cross-linking of the materials and impart strength and rigidity to them.

Materails of this type provide surfaces which have many advantages over materials which had previously been used for tracks, such as cinders, clay, sand, etc. They are in general long-wearing, resistant to adverse weather conditions, and require little maintenance in comparison with conventional recreational and athletic surfaces.

It is particularly desirable that the materials have great strength in order to avoid damage caused by the impart of such objects as runners' spikes and horseshoes. Thus, an important characteristic of the materials is their tear strength.

It is common to fill the polymer compostiions with various inert materials, such as rubber, inert clays, etc. These fillers achieve a reduction in material costs of the surfaces and in the case of the clay or clay-like fillers effect some improvement in tear strength. However, the strength improvement is small even with the addition of large amount of the fillers, and an undesirable increase in surface hardness which occurs with increased filler loading decreases the suitability of the materials for recreational surfaces. It is thus important that significantly increased tear strength be imparted to the materials without the necessity of using large amounts of conventional fillers.

Description of the prior art

U.S. Pat. No. 3,272,098 discloses resilient polyurethane paving surfaces containing inert fillers and from 10 to 50 percent by volume of resilient aggregate. Examples of the fillers which are employed include ground tripoli or clay, carbon black, titanium dioxide, hollow beads, etc.

SUMMARY OF THE INVENTION

Resilient paving materials are provided, the materials comprising cross-linked, organic polyol-based polyurethanes containing from about 10 to 80, preferably 20 to 60, percent by weight of inert fillers, and, in an amount sufficient to impart improved tear strength, a minor portion of attapulgite.

Description of the preferred embodiments

While the compositions of this invention may be factory-prepared, and thus the order of reaction may be varied from that which will be described, the most important application of the compositions is in-situ preparation for which the order of reaction is dictated. The essential characteristics of the compositions are not affected by the method of preparation in this respect.

In using in-situ preparation, the polyurethane surfaces are prepared on the spot at which they are to be laid, the mixture of reactants being placed in liquid form upon the surface to be covered. Because of the danger of the workmen and by-standers developing isocyanate sensitivity from exposure to unreacted relatively low molecular weight isocyantes used in the preparation of the compositions, in-situ preparation generally involves the use of plant-prepared premixes. Thus, one premix (prepolymer premix) contains a prepolymer which comprises the reaction product of an aryl or alkyl polyisocyanate with an organic polyol having at least two hydroxyl groups per molecule. The polyol is added in an amount sufficient to partially polymerize the isocyanate, but no more than in an amount necessary to leave the product in liquid form at ambient temperatures. The prepolymer premix may contain all or a portion of the fillers employed in the surface. Sufficient unreacted isocyanate groups are left in the premix to facilitate formation into a resilient surface material by the later addition of an amount of polyol sufficient to substantially react with all of the remaining isocyanate groups. The later added polyol is generally added in the form of another premix (the polyol premix) which may contain a catalyst and all or a portion of the fillers employed.

The polyisocyanates which may be used to prepare the compositions of this invention are well known, examples being 2,4-tolylene diisocyanate, mixtures of 2,4-tolylene diisocyanate and 2,6-tolylene diisocyanate, biphenylmethane 4,4'-diisocyanate, hexamethylene diisocyanate 3,3'-dimethylidiphenylmethane 4,4'-diisocyanate, metaphenylene diisocyanate, triphenylmethane diisocyanate, octamethylene diisocyanate, hexamethylene diisocyanate.

Examples of the polyols which are reacted with the polyisocyanate to provide initial cross linking include polyalkylene ether polyalcohols, also called polyoxyalkylene polyalcohols or polyoxyalkylene ether polyalcohols. Examples of such polyalkylene ether polyalcohols are polyethylene glycols, polypropylene glycols, and reaction products of alkyleneoxides, such as ethylene oxide or propylene oxide or mixtures of ethylene oxide and propylene oxide with polyhydric alcohols, such as dihydric alcohols (glycols) or trihydric alcohols. Examples of such reaction products of alkylene oxides are polyhydric alcohols or reaction products of ethylene oxide or propylene oxide or mixtures of ethylene oxide and propylene oxide with ethylene glycol, propylene glycol, tetramethylene glycol, 1,2-butanediol, 1,3-butanediol, 2,3-butanediol, 2,2-dimethyl-1,3-propanediol, 2,2-diethyl-1,3 propanediol, 2-ethyl, glycerol trimethyl propane, 1,2,6-hexanetriol.

It is preferred that the polyol, usually a diol or triol, including that which is to complete the formation of the surfaces, have a molecular weight between about 1,000 and about 3,000. Materials having molecular weights below about 1,000 yield a surface lacking sufficient resiliency for the purposes intended and materials of over about 3,000 molecular weight produce a structure lacking sufficient strength.

The compositions, as previously mentioned, may contain various inert fillers in amounts of from about 10 to about 80% by weight. Examples of the fillers which may be employed include kaolinite clay, barites, limestone dust, calcium carbonate, barium sulfate, and various commercial clays. Clays which may be employed include those which contain the montmorillonite minerals such as montmorillonite, beidellite, montronite, hectorite, saponite, and sauconite. Another group of clays which may be included are the potassium-bearing clay minerals from the illite-bravisite-hydromica group. High alumina clays may also be employed. A description of the clays which are suitable for use may be found in vol. 4, Kirk-Othmer "Encyclopedia of Chemical Technology," pages 31–73. It is preferred that the filler be employed in finely divided form.

The attapulgite which is used to increase the tear strength of the compositions may be added to either the prepolymer premix or to the polyol premix previously described, or, when the surface is formed in a one-step synthesis, may be introduced at any step of the reaction. The attapulgite is employed in minor amounts, from about 0.1 to 10, preferably from about 0.2 to 5.0, percent by weight of the total surfacing composition. The attapulgite clay mineral is described in Kirk-Othmer, "Encyclopedia of Chemical Technology," vol. 4 at page 32. It is named from its occurrence at Attapulgus, Georgia, where it is quarried as fuller's earth. This clay is unique in that its lattice structure is chain-like, similar to hornblend structure and dissimilar from the mica-like sheets of other clay mineral groups. A representative analysis of an attapulgite clay mineral from Attapulgus, Georgia, is as follows: 50.03% $SiO_2$, 10.24% $Al_2O_3$, 3.53% $Fe_2O_3$, 10.49% $MgO$, 0.47% $K_2O$, 9.73% $H_2O$ removed at 150° C., 10.13% $H_2O$ removed at high temperatures; 99.62% total.

In order to demonstrate the improved tear strength of the compositions of this invention, in the following examples typical filled polyurethane surfaces were prepared. The examples are only illustrative and are non-limiting.

Example 1.—Preparation of filled polyurethane premix

A 284-gram portion of Voranol P-1010 (a polyethenoxy glycol diol manufactured by Dow Chemical Company and having a molecular weight of about 1000) was blended with 770 grams of barium sulfate in a disperser. Under a vacuum of about 6–10 mm. Hg, the material was warmed to a temperature in a range of about 130–140° F. for 1½ hours. The vacuum was then removed and a 246-gram portion of tolylene diisocyanate (80/20 mixture of 2,4 and 2,6-isomers) was added to the reaction mixture. The initial temperature of the mixture was 122° F. Stirring of the mixture was continued for a period of 1 hour. The product was a viscous liquid having an isocyanate content of 8.58% by weight. The material is called a "premix."

Example 2.—Preparation of filled polyol premix

The following materials were mixed at room temperature in a flask: 660 grams of Polyol SA-1626 (a Dow Chemical Company polyethenoxy glycol having a molecular weight of about 1626 and an —OH content of 4.70% by weight), 314 grams of China clay, 20 grams of chromium oxide, 2 grams of black ferric oxide, 2 grams of phenyl mercuric acetate (60% Hg), and 2 grams of lead octoate.

The mixture was degassed for 2 hours under a vacuum of about 6–10 mm.'s Hg at a temperature of about 145° F. Water was reduced to 0.123% by weight. The product is identified as "polyol premix."

Example 3.—Preparation of polyol premix with attapulgite

Following the general procedure of Example 1 (with the exception that the materials were not degassed), a mixture was prepared containing 28.4 grams of the polyol, 47.0 grams of barium sulfate, and 24.6 grams of tolylene diisocyanate, with 0.75 grams of Attagel 30 (an attapulgite clay produced by the Engelhard Company and having the following characteristics:

Average particle size—0.12 micron, needle-like
Free moisture—12% by weight
Surface area—210 sq./m./g.)

The mixture was stirred for 1 hour during which time the temperature rose from 112 to 125° F. with no external heat applied.

Example 4.—Preparation of filled polyurethane

Polyurethane materials were prepared by mixing the polyol mix of Example 2 and the filled polyols of Examples 1 and 3. The samples were prepared by mixing the premix with 100 grams of the filled polyol in a quantity sufficient to provide a ratio of isocyanate to hydroxy groups of 1.05/1. The materials were stirred together for a period sufficient to assure complete mixing and then poured onto 1-gallon tin-can lids. The materials were then allowed to set. The following materials were prepared:

(A) A 95-gram portion of the premix of Example 1 was mixed with a 100-gram portion of the filled polyol of Example 2. The mixture was stirred for about 2 minutes in order to assure even mixing and the mixture was poured onto a 1-gallon-can lid and allowed to solidify.

(B) The procedure of A was followed employing 97 grams of the product of Example 3 as the premix.

The materials prepared in Example 4 were subjected to strength tests; tensile strength, percent elongation before break, split tear strength, and Shore A hardness were determined.

The split tear strength was determined by Federal Test Method, FTMS-601, method M 221, Apr. 12, 1955, with modifications described below. The method, which is used in determining the tear resistance of soft rubber-like compounds may be briefly described as follows: A strip specimen of the material approximately ¼" thick, 2" long and 1" wide as described is taken for testing. The test section is slit along a longitudinal axis to within 0.5" of one end. The material is placed in a Scott tester, and the force necessary to rupture the specimen is determined with the power-actuated grip of the tester traveling at a uniform speed of 12" per minute. The maximum breaking force in pounds is determined. The tear resistance is then calculated in pounds per inch of thickness.

Data from the tests on the materials of Example 4 are included in the following table:

TABLE I.—STRENGTH CHARACTERISTICS OF BARIUM SULFATE-FILLED POLYURETHANES

| Example | Setting time, mi. | Tensile strength (Instron) p.s.i. | Elongation, percent | Shore hardness | Tear strength, p.s.i./in. |
|---|---|---|---|---|---|
| 4A | 90 | 446 | 315 | 56 | 24 |
| 4B [1] | 75 | 436 | 310 | 62 | 48 |

[1] 0.5% attapulgite clay.

It can be seen from these data that the addition of only 0.5 gram of the attapulgite clay to the polyurethane resulted in a doubling of the tear strength (from 24 to 48 lbs. per inch) and did not significantly affect the other strength characteristics of the material.

Example 5.—Preparation of limestone-filled prepolymers

In a manner similar to the process of Example 1 premixes were prepared employing instead of barium sulfate, 57% of fine $CaCO_2$ as the filler and degassing the premixes under vacuum. The material containing no attapulgite was referred to as 5A, and that containing 1.2% of the attapulgite was referred to as 5B.

Example 6.—Preparation of clay-filled polyol mix

In a manner similar to the process of Example 2, a polyol mix containing 33.4% by weight of McNamee clay was prepared. The material contained 0.2% by weight each of phenyl mercuric acetate and lead octoate.

Example 7—Preparation of clay-filled polyurethane 93.5 grams of the premix of Example 5A was reacted with 100 grams of the polyol mix of Example 6 to yield a polyurethane. Similarly, an 85-gram portion of the premix of Example 5B was reacted with 100 grams of the polyol mix of Example 6 to yield a polyurethane material. The products will be referred to respectively as Examples 7A and B.

Data from tests performed on the examples of 7A and B are included in the following table:

TABLE II.—STRENGTH CHARACTERISTICS OF CLAY FILLED POLYURETHANES

| Example | Setting time, min. | Tensile stuength (Instron) p.s.i. | Elongation, percent | Shore hardness | Tear strength, p.s.i./in. |
|---|---|---|---|---|---|
| 7A | 80 | 570 | 290 | 61 | 25 |
| 7B | 75 | 495 | 270 | 57 | 41 |

As can be seen from these data, an increase in tear strength of about 40% occurred with the addition of only 0.65% of attapulgite to the clay-filled polyurethane.

Thus, the compositions of this invention provide relatively inexpensive surfacing materials, particularly suitable for recreational and athletic use which have a high degree of tear strength. High tear strength is particularly important in the surface materials. While tensile strength and elongation are significant, high tear resistance provides a large degree of protection against the type of damage which is most likely to be encountered and results from pressure of spikes and horseshoes, etc.

What is claimed is:

1. A resilient paving material comprising a cross-linked, organic polyol-based polyurethane containing from 10 to 80% by weight of inert fillers selected from the group consisting of China clay, kaolinite, barites, calcium carbonate, montmorillonite, beidellite, montronite, hectorite, sauconite, saponite, carbon black and titanium dioxide and from about 0.1 to 10% by weight of attapulgite, said amount being sufficient to impart improved tear strength to the material.

2. The paving material of claim 1 in which the inert filler is present in the amount of from about 20 to 60% by weight.

3. The paving material of claim 2 in which the attapulgite is present in an amount of from about 0.2 to 5.0% by weight.

No references cited.

T. MORRIS, Assistant Examiner

MORRIS LIEBMAN, Primary Examiner